United States Patent [19]

Glass et al.

[11] Patent Number: 4,800,091

[45] Date of Patent: Jan. 24, 1989

[54] CHEWING GUM COMPOSITIONS HAVING SEQUENTIAL ACID RELEASE

[75] Inventors: Michael Glass, Fairlawn; Joseph Hoholick, Hopatcong; Amy Dombroski, Budd Lake; Steven M. Faust, Stanhope, all of N.J.

[73] Assignee: Warner-Lambert Company, Morris Plains, N.J.

[21] Appl. No.: 934,752

[22] Filed: Nov. 25, 1986

[51] Int. Cl.$^4$ .................................................. A23G 3/30
[52] U.S. Cl. .......................................... 426/3; 426/5
[58] Field of Search ........................................ 426/3–6

[56] References Cited

U.S. PATENT DOCUMENTS

| 3,795,744 | 3/1974 | Ogawa et al. | 426/3 |
| 4,085,227 | 4/1978 | MacKay et al. | 426/3 |
| 4,088,788 | 5/1978 | Ream et al. | 426/3 |
| 4,151,270 | 4/1979 | Ream et al. | 426/3 |
| 4,217,368 | 8/1980 | Witzel et al. | 426/3 |
| 4,493,849 | 1/1985 | Carroll et al. | 426/3 |
| 4,568,537 | 2/1986 | Hoerman et al. | 426/3 |

OTHER PUBLICATIONS

Abstract for Japanese No. 58-193655.

*Primary Examiner*—Jeanette Hunter
*Attorney, Agent, or Firm*—Henry Jeanette; Daniel A. Scola; Gary M. Nath

[57] ABSTRACT

A chewing gum composition having prolonged juiciness and flavor through the incorporation of a premixed blend of acids having different organic/aqueous partitioning coefficients such that they have sequential release rates during mastication.

15 Claims, No Drawings

CHEWING GUM COMPOSITIONS HAVING SEQUENTIAL ACID RELEASE

This invention relates to chewing gum compositions having prolonged juiciness and flavor perception. More particularly this invention relates to the incorporation in a chewing gum compositon of a mixture of at least three organic food acids having different release rates.

Prolonged flavor and sweetener perception in chewing gum compositions have long been the subject of chewing gum research and development. Typically the art has focused on obtaining prolonged release of flavors or sweeteners through encapsulation of these materials with various types of coatings. For example, U.S. Pat. No. 4,515,769 discloses an encapsulated flavorant composition prepared by the steps of forming an emulsion of flavoring agent in a partially hydrophilic matrix comprising gelatin, a natural gum or albumin and plasticizer; drying the emulsion to a solid matrix; grinding to a solid base powder; and then coating the base powder with a water insoluble material.

U.S. Pat. Nos. 2,886,440, 2,886,445, 2,886,446 and 2,886,449 all describe gelatin encapsulation of flavor oil. U.S. Pat. No. 4,597,970 describes a sweetener delivery system which both protects the sweetener and controls the release of sweetener through the use of a hydrophobic matrix which enrobes the sweetener particle. The matrix consists essentially of lecithin, an edible fat acid or wax having a melting point range of 25° C. to about 100° C., and a glyceride.

Additionally, food acids have been added to chewing gum products to produce sour tastes or to enhance certain flavor qualities. U.S. Pat. No. 4,085,227 discloses a chewing gum composition which incorporates a finely divided poorly water-soluble sweetener and/or a finely divided poorly water-soluble food acid in the gum base during preparation. The fine particle size, i.e., 150 microns or less, when admixed with the gum base becomes "trapped" in the gum base and the rate of extraction during mastication is decreased. The patentee states that the reason for this effect is that the sweetener and food acid, being of fine particle size, appear to be more completely protected from contact with saliva by the gum base. The compositions of this reference use fumaric, adipic or succinic acids, 150 microns or less, in amounts of about 0.5 to about 3.5% by weight. Thus, the emphasis of this reference is to use the gum base as a means of "encapsulating" the sweetener or food acid.

Thus, the prior art attempts of delaying sweetener and/or flavor release have focused on directly contacting the particles with a coating material which will require rupture during mastication for release in the mouth. Typically, a non-encapsulated flavor or sweetener is added as well, to give an initial burst of flavor or sweetener, followed by the more delayed release of the encapsulated form. Generally, most of the free flavor and sweetener will release into the oral cavity soon after mastication has begun and will be quickly depleted. Additionally, encapsulations pose extra process parameters, expense and often contribute to grittiness in the final product.

None of the prior art has focused on taking advantage of the different solubility rates of acids in chewing gum compositions. These release rates are dependent upon their organic/aqueous partitioning coefficients (Po/a). Organic acids having a high Po/a, release from the chewing gum matrix slower than acids with low Po/a values. The instant invention utilizes a mixture of acids having widely varied Po/a values. The incorporation of this mixture in a chewing gum composition results in a sequence of acid release rates during chew. The result is a prolonged juiciness and/or tartness due to the overlapping of the acid release times. Thus, at any one time during mastication, one or more acids will be present to create or enhance the desired flavor.

Thus, instead of employing standard encapsulation techniques to extend flavor and sweetness, the instant invention utilizes a combination of acids having sequential release rates without the need for encapsulation.

SUMMARY OF THE INVENTION

This invention concerns a chewing gum composition having prolonged juiciness and flavor by virtue of the incorporation of sequentially released non-encapsulated acids, said composition comprising:
(a) a gum base;
(b) a sweetener;
(c) a flavor; and
(d) a mixture of at least three non-encapsulated organic acids having varying release rates, said acids being selected from the group consisting of malic, adipic, fumaric, citric, tartaric and mixtures thereof.

DETAILED DESCRIPTION AND PREFERRED EMBODIMENTS

As previously mentioned, the combination of the above-mentioned acids results in a sequential release of acid during chew due to the varying solubility rates of the different acids. The organic/aqueous partitioning coefficients of the useful acids, in $CHCL_3/H_2O$, are as follows (logarithm of partitioning coefficients are used to simplify):

| Acid | Log P $CHCL_3/H_2O$ | Comparative Release Time |
| --- | --- | --- |
| Citric | −4.26 | Earliest |
| Malic | −3.55 | Transitional |
| Tartaric | −3.56 | Transitional |
| Adipic | −2.14 | Late |
| Fumaric | −1.50 | Late |

The acids are individually employed in amounts of about 0.1% to about 1.5% and preferably about 0.3 to 0.5% by weight of the total chewing composition.

The total acid content of the chewing gum composition will vary depending on the type of flavor chosen and the desired tartness. Total acid content should generally not exceed a level of about 1.5% by weight. While it is a requirement that the three acids be in the non-encapsulated, free form, additional food acids made be added in the encapsulated form to obtain a desired effect.

The chewing gum compositions of the instant invention employ gum base in varying amounts depending upon the type of base used, consistency desired and type of chewing gum product intended to be made. In general, useful amounts of gum base vary from about 5% to about 45% by weight of the final chewing gum composition, with preferred amounts being about 15% to about 30% by weight and most preferably about 15% to about 25%. The gum base may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, guayule, jelutong, gutta percha and crown gum. Synthetic elastomers such as butadiene-styrene copolymers, isobutylene-isoprene copolymers, polyethylene, polyisobutylene and polyvinyl-acetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin and partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and the partially hydrogenated methyl ester of rosin, such as polymers of alpha-pinene or beta-pinene, terpene resins including polyterpene and mixtures thereof. The solvent may be employed in an amount ranging from about 10% to about 75% and preferably about 45% to about 70% by weight of the gum base.

A variety of traditional ingredients such as plasticizers or softeners such as lanolin, stearic acid, sodium stearate, potassium stearate, glyceryl triacetate, glycerine and the like, for example, natural waxes, petroleum waxes such as polyurethene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may also include the conventional additives such as flavoring agents; coloring agents such as titanium dioxide; emulsifiers such as lecithin and glyceryl monostearate; and additional fillers such as aluminum hydroxide, alumina, aluminum silicates, calcium carbonate, and talc. Combinations of these conventional additives are contemplated. These fillers may also be used in the gum base in various amounts. Preferably the amount of fillers when used will vary from about 4% to about 30% by weight of the final chewing gum.

The present invention contemplates the inclusion of those sweeteners well known in the art, including both natural and artificial sweeteners. Thus, sweeteners may be chosen from the following non-limiting list: sugars such as sucrose, glucose (corn syrup), dextrose, invert sugar, fructose, and mixtures thereof; saccharine and its various salts such as the sodium or calcium salt; cyclamic acid and its various salts such as the sodium salt (cyclamates); the dipeptide sweeteners such as aspartame; natural sweeteners such as dihydrochalcone; glycyrrhizin; *Stevia rebaudiana* (Stevioside); and sugar alcohols such as sorbitol, sorbitol syrup, mannitol, xylitol, and the like. Also contemplated as a sweetener is the non-fermentable sugar substituted hydrogenated starch hydrolysate (lycasin) which is described in U.S. Reissue Pat. No. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Pat. No. 2,001,017.7.

The sweeteners, and flavors may be added in the encapsulated and/or non-encapsulated form.

The colorants useful in the present invention, include the pigments such as titanium dioxide, and may be incorporated in amounts of up to about 1% by weight, and preferably up to about 6% by weight. Colorants may also include dyes suitable for food, drug and cosmetic applications. These colorants are known as F.D.&C. dyes. The materials acceptable for the foregoing spectrum of use are preferably water-soluble. Illustrative examples include indigo dye, known as F.D.&C. Blue No. 2, which is the disodium salt of 5,5'-indigotin-di-sulfonic acid. Similarly, the dye known as F.D.&C. Green No. 1, comprises a triphenylmethane dye and is the monosodium salt of the 4-[4-Methyl-p-sulfobenzyl-amino)diphenylmethylene][1-(N-ethyl-N-P-sulfo-benzyl)-2,5-cyclohexadienimine]. A full recitation of F.D.&C. and D.&C. colorants and their corresponding chemical structures may be found in the Kirk-Othmer Encyclopedia of Chemical Technology, in Volume 5, at pages 857–884.

The acid mixture of the instant invention may also be used in conventional soft and hard confections. The preparation of soft confections, such as nougat, involves conventional methods, such as the combination of two primary components, namely (1) a high boiling syrup such as corn syrup or the like and (2) a relatively light textured frappe, generally prepared from gelatin, egg albumen, milk proteins such as casein and vegetable proteins such as soy protein, and the like. The frappe is generally relatively light, and may, for example, range in density from about 0.5 to about 0.7.

The high boiled syrup of the soft confectionery is relatively viscous and possesses a higher density, and frequently contains a substantial amount of sugar. Conventionally, the final nougat composition is prepared by the addition of a high boiled syrup to the frappe under agitation, to form the basic nougat mixture. Further ingredients such as flavoring, additional sugar, colorants, preservatives, medicaments, mixtures thereof and the like may be added thereafter also under agitation. General discussion of the composition and preparation of nougat confections may be found in B. W. Minifie, *Chocolate, Cocoa and Confectionery Science and Technology*, 2nd edition, AVI Publishing Co., Inc., Westport, Conn. (1980), at pages 424–425.

The procedure for preparing the "soft" confectionery involves known procedures. In general, the frappe component is prepared first and thereafter the syrup component is slowly added under agitation at a temperature of at least 65° C., and preferably at least 100° C. The mixing of components is continued to form a uniform mixture, after which the mixture is cooled to a temperature below 80° C., at which point the flavor may be added. The mixture is further mixed for an additional period until it is ready to be removed and formed into suitable confectionery shapes.

Similar to the soft confectionery, hard confectionery may be utilized in this invention. Likewise, it may be processed and formulated by conventional means. In general, a hard confectionery has a base composed of a mixture of cane or beet sugar, polyhydric alcohols and glucose syrup. Low moisture levels, e.g., from 0.5 to 1.5% and are present in the final confectionery in amounts of between about 5% and about 99% by weight of the final composition. Such confectionery may be routinely prepared by conventional methods, such as those involving fire cookers, vacuum cookers and scraped-surface cookers also referred to as high speed atmospheric cookers.

Fire cookers involving the traditional method of making candy base, may be used. In this method the desired quantity of sugar is dissolved in water by heating in a kettle until the sugar dissolves. Corn syrup or an invert sugar is then added and cooking continued until a final temperature of 145° to 156° C. is achieved. The batch is then cooled and worked as a plastic-like mass to incorporate additives.

A high-speed atmospheric cooker uses a heat-exchange surface. Processes using it involve spreading a film of candy on a heat exchange surface, and heating the candy to 165° to 170° C. in a few minutes. The candy is then rapidly cooked to 100° to 120° C. and worked as a plastic-like mass enabling incorporation or the additives, such as flavor, color, acidulents and medicaments. It is at this point that the inventive acid mixture is blended into the candy.

In vacuum cookers, the sugar and corn syrup are boiled to 125° to 132° C. and vacuum applied and additional water is boiled off without extra heating. When cooking is complete, the mass is a semi-solid, having a plastic-like consistency. At this point, color, flavors and other additives are mixed in the mass by routine mechanical mixing operations.

The optimum mixing required to uniformly mix the flavor, color and other additives during conventional manufacturing of hard confectionery is determined by the time needed to obtain a uniform distribution of the materials. Normally, mixing times of 4 to 10 minutes have been found acceptable.

Once the candy mass has been properly tempered, it may be cut into workable portions or formed into desired shapes. A general discussion of the composition and preparation of hard confections may be found in H. A. Lieberman, *Pharmaceutical Dosage Forms: Tablets Vol* 1 (1980), Marcel Dekker, Inc. at pages 339 to 469.

It should be mentioned that the apparati useful in accordance with the present invention comprise those cooking and mixing apparati well known in the confectionery manufacturing arts, and therefore the selection of a specific apparatus will be apparent to the artisan.

The confectioneries useful in conjunction with the compositions of this invention include, but are not limited to, sugarless boiled candy, lozenges, pressed tablets, toffee and nougat, gels, mints, syrups, liquids, elixirs and the like.

The present invention includes a method for preparing a chewing gum composition, including both chewing gum and bubble gum formulations. The gum base is conventionally melted at temperatures that may range from about 60° to about 120° C. for a period of time sufficient to render the base molten. For example, the gum base may be heated under these conditions for a period of about thirty minutes just prior to mixing with the remaining ingredients of the gum composition.

The order of addition of the remaining ingredients is not critical. A preferred procedure involves mixing the gum base with the softener until a uniform homogenous mass is obtained, then a portion of the sweetening agent (normally one-half) is added to the heated gum base and blending is continued until a homogenous mass is prepared, preferably up to five minutes. The remaining sweetener and flavor oil are added and again blended to form a uniform composition. At this point the organic acid mixture is added and mixing is continued. Finally, glycerin is added along with the remainder of the ingredients, including the colorant, if any, and other adjuvants are added and the resulting composition is then mixed for a period of time that may range as high as thirty minutes, to form a fully uniform composition. The mass is then removed from the mixer and is allowed to cool further and may thereafter be formed into various final shapes by known gum manufacturing techniques. For example, the mass may be rolled in contact with a conventional dusting medium, such as calcium carbonate, mannitol, talc and others.

The gum composition of the present invention may be prepared into all the various end forms known commercially, including slab form, stick form, cube form and center-filled form. Sugar and sugarless chewing gums are contemplated within the scope of this invention. All of the techniques associated with the preparation of the products in these forms are well known and the present method may vary somewhat depending upon the specific end product to be manufactured without departing from the essential parameters. Such other details are presented for purposes of illustration, and to provide a best mode for the practice of the invention, and therefore the invention should not be limited to those parameters.

A preferred process of preparing a chewing gum composition which when chewed gives the user the sequential release of acids involves: (a) admixing a chewing gum base at a temperature from about 60° C. to about 90° C. with a softener to obtain a homogenous pliable mixture; (b) while mixing, add to the homogenous pliable mixture a sweetening agent and a flavor oil in the amount of 0.2% to about 2% by weight; (c) adding a premixture of at least three organic acids and color as well as the remaining chewing gum ingredients and mixing for about 4 minutes until a uniform mass is obtained; and (d) thereafter form the mixture into suitable chewing gum shapes.

The following examples serve to provide further appreciation of the invention but are not meant in any way to restrict the effective scope of the invention. All percentages throughout the specification are by weight % of the final chewing gum composition unless otherwise indicated.

EXAMPLES

Chewing gum compositions were prepared using the process disclosed herein in accordance with the formulations tabulated below. Those formulations marked "Prior Art" are representative of gum compositions containing only one acid at levels common to the art, i.e., 0.75–1.0%. Those compositions marked "Inventive" are representative of compositions according to the instant invention, whereby three acids having different release rates are incorporated therein.

| | Raspberry | | Grape/Cherry | | | |
|---|---|---|---|---|---|---|
| Examples: | (1)P-1 | (2)I-1 | P-2 | I-2 | I-3 | I-4 |
| Gum Base | 19.500 | 19.500 | 19.500 | 19.500 | 19.500 | 19.500 |
| Emulsifier | 0.250 | 0.250 | 0.500 | 0.500 | 0.500 | 0.500 |

-continued

| Examples: | Raspberry | | Grape/Cherry | | | |
|---|---|---|---|---|---|---|
| | (1)P-1 | (2)I-1 | P-2 | I-2 | I-3 | I-4 |
| Corn Syrup | 22.500 | 22.500 | 24.000 | 24.000 | 24.000 | 24.000 |
| Softener | 2.000 | 2.000 | 2.000 | 2.000 | 2.000 | 2.000 |
| Sugar | 53.073 | 52.573 | 48.578 | 48.028 | 48.028 | 48.028 |
| Color | 0.127 | 0.127 | 0.122 | 0.122 | 0.122 | 0.122 |
| Glycerin | 0.100 | 0.100 | 1.000 | 1.000 | 1.000 | 1.000 |
| Vegetable Oil | — | — | 0.300 | 0.300 | 0.300 | 0.300 |
| Liquid Flavor | 0.700 | 0.700 | 0.750 | 0.750 | 0.750 | 0.750 |
| Delayed Release Encap. Flavor | — | — | 2.500 | 2.500 | 2.500 | 2.500 |
| Maltodextrin | 0.750 | 0.750 | — | — | — | — |
| Malic Acid* | — | 0.5 | 0.750 | 0.400 | 0.400 | — |
| Adipic** | — | 0.5 | — | — | 0.500 | 0.500 |
| Fumaric Acid*** | — | — | — | 0.500 | — | — |
| Citric Acid**** | 1.000 | 0.5 | — | 0.400 | 0.400 | 0.400 |
| Tartaric Acid***** | — | — | — | — | — | 0.400 |

*Log P CHCL$_3$/H$_2$O of Malic Acid = −3.55 (Transitional release)
**Log P CHCL$_3$/H$_2$O of Adipic Acid = −2.14 (Transitional release)
***Log P CHCL$_3$/H$_2$O of Fumaric Acid = −1.50 (Late release)
****Log P CHCL$_3$/H$_2$O of Citric Acid = −4.26 (Earliest release)
*****Log P CHCL$_3$/H$_2$O of Tartaric Acid = −3.56 (Transitional release)
(1)P-# = prior art composition
(2)I-# = inventive composition Expert panelists were asked to evaluate each of the chewing gum compositions for juiciness, flavor intensity and overall liking at various intervals during chew. The results, tabulated below, on a scale of 0–10 with 10 representing the most preferred, indicate that the compositions containing a single acid scored significantly lower at the 2 minute and 5 minute interval. These results indicate the effect of the sequential release of the three acids on the prolongation of juiciness and flavor.

| | Juiciness | | | Flavor | | | |
|---|---|---|---|---|---|---|---|
| Composition | 30 Sec. | 2 Min. | 5 Min. | 30 Sec. | 2 Min. | 5 Min. | Overall Liking |
| P-1 | 9.2 | 5.0 | 1.8 | 8.4 | 4.8 | 2.0 | 7.4* |
| I-1 | 8.1 | 7.1 | 5.4 | 7.9 | 7.1 | 4.8 | 8.5* |

*These values represent statistically significant results which would be expected to be duplicatable 90% of the time.
Note: The higher initial juiciness and flavor impact of P-1 (prior art technology) is expected because it has a high content of a low P o/a acid (small Log value), i.e., citric acid.

Ten panelists evaluated three (3) experimental three (3) acid gums (I-2, I-3, I-4) versus a control, P-2 (single acid system). These gums all contained an encapsulated cherry flavor for a second delayed flavor release (3–4) minutes into chew). Panelists found every three acid system to have longer lasting juiciness, bigger flavor impact at second flavor delivery, and less bitterness at time of second flavor delivery. The preferred inventive three acid system was a combination of citric, malic and adipic.

| | Juiciness | | | Flavor | | | Bitterness | |
|---|---|---|---|---|---|---|---|---|
| Composition | 30 Sec. | 2nd Flvr. Release | 5 Min. | 30 Sec. | 2nd Flvr. Release | 5 Min. | 2nd Flvr. Impact | Overall Liking |
| P-2 | 7.3 | 5.9 | 3.2 | 7.2 | 6.7 | 2.8 | 6.1 | 6.7* |
| I-2 | 8.4 | 6.6 | 4.8 | 7.5 | 7.0 | 4.2 | 5.0 | 7.4 |
| I-3 | 8.8 | 7.3 | 6.4 | 7.7 | 7.4 | 5.8 | 3.2 | 8.1* |
| I-4 | 8.1 | 6.3 | 6.3 | 7.5 | 7.5 | 5.5 | 4.0 | 7.5 |

*Significant at 90% confidence level, representing expected duplication results 90% of the time.

The invention being thus described, it will be obvious that the same may be varied in many ways. Such variations are not to be regarded as a departure from the spirit and scope of the invention and all such modifications are intended to be included within the scope of the following claims.

We claim:

1. A chewing gum composition having prolonged juiciness and flavor by virtue of the incorporation of sequentially released non-encapsulated acids, said composition comprising a uniform composition of:
   (a) a gum base;
   (b) a sweetener;
   (c) a flavor; and
   (d) a mixture of at least three non-encapsulated organic acids resulting in a sequence of acid release rates, said mixture comprising: (i) citric acid having the earliest release time, (ii) one or more acids having a transitional release time with said acids being selected from the group consisting of malic acid and tartaric acid, and (iii) one or more acids having a late release time with said acids being selected from the group consisting of adipic acid and fumaric acid.

2. The chewing gum composition of claim 1 wherein the total acid mixture is present in amounts of about 0.1 to about 1.5% by weight.

3. The chewing gum composition of claim 1 wherein the mixture of acids comprises adipic, citric and malic acids.

4. The chewing gum composition of claim 3 wherein the respective amounts of adipic, citric and malic acid are about 0.1 to about 0.5%, about 0.1 to about 0.5% and about 0.1 to about 0.5% by weight.

5. The chewing gum composition of claim 1 wherein the gum base elastomer is selected from the group consisting of chicle, jelutong, balata, guayule, guttapercha, lechi-capsi, sorva, butadiene-styrene copolymers, polyisobutylene, isobutylene-isoprene copolymers, polyethylene, polyvinylacetate and mixtures thereof.

6. The chewing gum composition of claim 5 wherein the gum base is present in amounts of about 5 to about 45% by weight.

7. The chewing gum composition of claim 1 wherein the sweetener is a natural or synthetic compound.

8. The chewing gum composition of claim 1 containing one or more of the additional components selected from the group consisting of additional agents, fillers, plasticizers, softeners, coloring agents, extenders, emulsifiers, acidulents and mixtures thereof.

9. The chewing gum composition of claim 1 having the film forming capability of a bubble gum.

10. The chewing gum composition of claim 9 containing substantially no sugar.

11. A fruit-flavored sugarless chewing gum composition comprising a uniform composition of a gum base, a sweetener, a flavor and a pre-mixture of at least three non-encapsulated organic acids having varying organic/aqueous partitioning coefficients resulting in a sequence of acid release rates, said mixture comprising: (i) citric acid having the earliest release time, (ii) one or more acids having a transitional release time with said acids being selected from the group consisting of malic acid and tartaric acid and (iii) one or more acids having a late release time with said acids being selected from the group consisting of adipic acid and fumaric acid.

12. The chewing gum composition of claim 11 wherein the flavor is selected from the group consisting of grape, cherry, apple, banana, pineapple, lemon, oranges, citrus mixtures and combinations thereof.

13. The chewing gum composition of claim 12 wherein the acids are malic, citric and adipic, present in amounts of about 0.1 to about 1.5% by weight.

14. The chewing gum composition of claim 11 as a bubble gum.

15. A process for preparing a chewing gum composition having a uniform composition comprising a pre-mixture of at least three non-encapsulated organic acids resulting in a sequence of acid release rates, said process comprising:

(a) admixing a chewing gum base with a softener at a temperature of about 60° C. to about 90° C. to obtain a homogeneous pliable mixture;

(b) adding to this mixture a sweetener and a flavor oil;

(c) further adding a pre-mixture of at least three non-encapsulated organic acids with said mixture comprising: (i) citric acid having the earliest release time, (ii) one or more acids having a transitional release time with said acids being selected from the group consisting of malic acid and tartaric acid, and (iii) one or more acids having a late release time with said acids being selected from the group consisting of adipic acid and fumaric acid, while mixing to obtain a homogeneous mass; and (d) forming the mixture into suitable chewing gum shapes.

* * * * *